May 11, 1937.  E. A. J. KOCH  2,079,808
HEATING SYSTEM
Filed Oct. 13, 1934    5 Sheets-Sheet 1
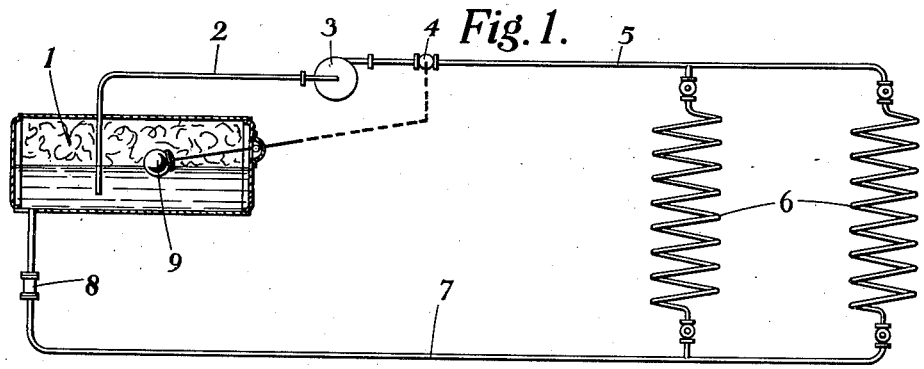
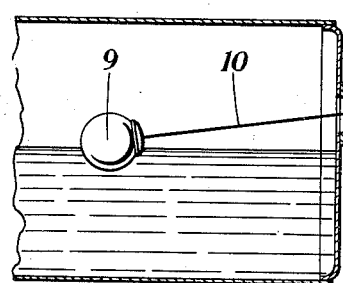
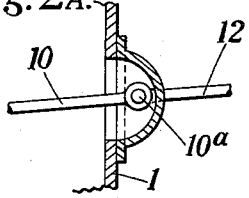
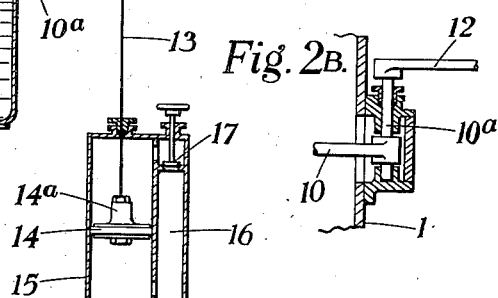
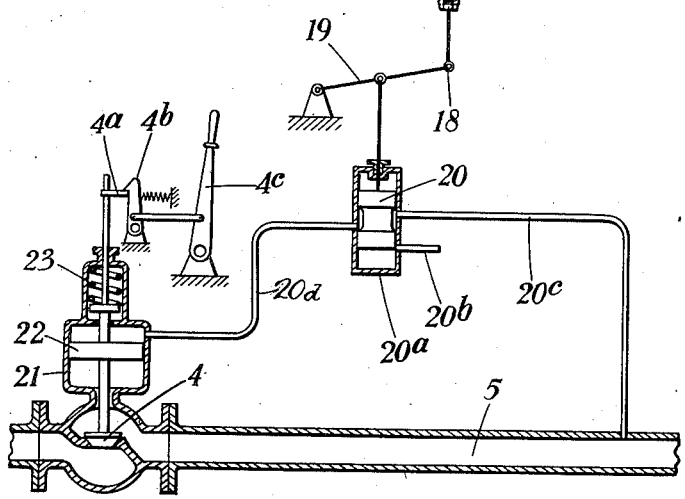
INVENTOR
E.A.J. KOCH
BY
Sydney E. Page.
ATTORNEY May 11, 1937.  E. A. J. KOCH  2,079,808
HEATING SYSTEM
Filed Oct. 13, 1934  5 Sheets-Sheet 2

INVENTOR
E.A.J. KOCH
BY Sydney E. Page
ATTORNEY

May 11, 1937.  E. A. J. KOCH  2,079,808
HEATING SYSTEM
Filed Oct. 13, 1934    5 Sheets-Sheet 3

INVENTOR
E.A.J. KOCH
BY Sydney E. Page.
ATTORNEY

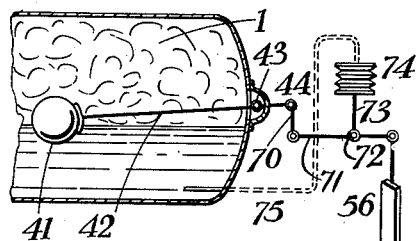
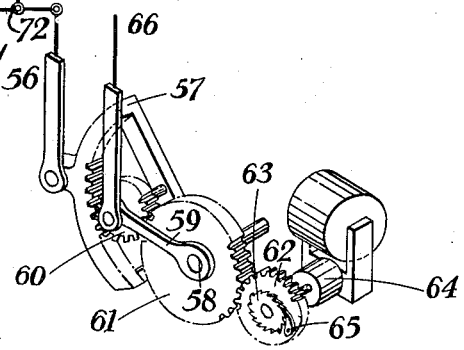
Fig.6.
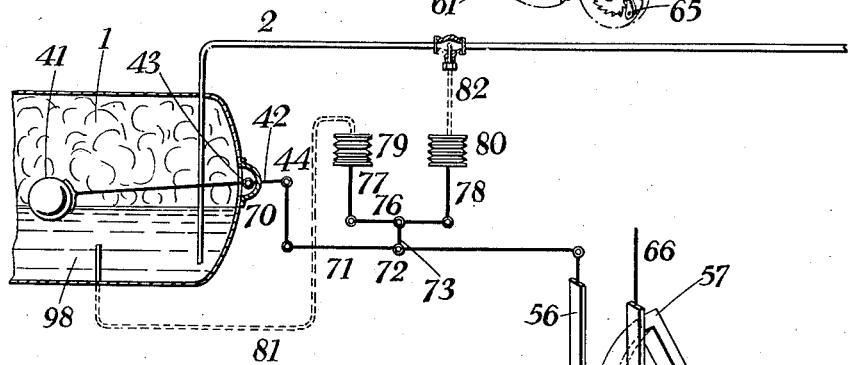
Fig.7.
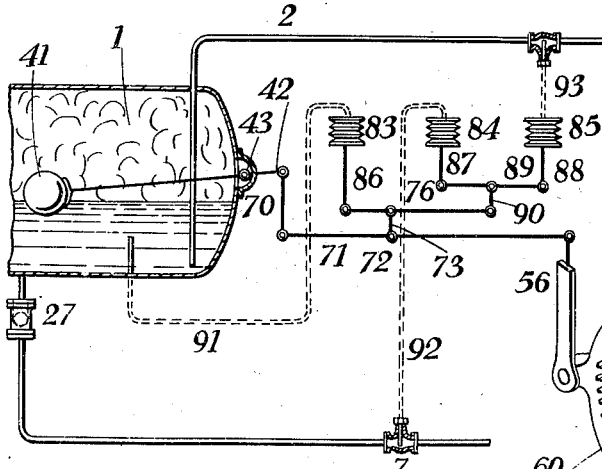
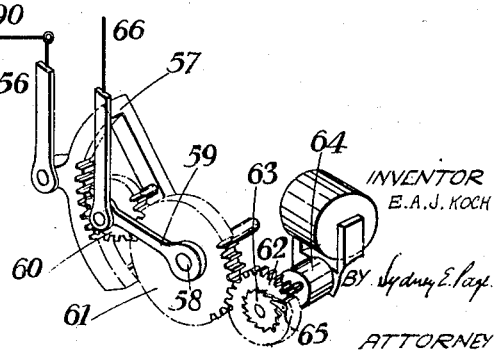
Fig.8

May 11, 1937.  E. A. J. KOCH  2,079,808
HEATING SYSTEM
Filed Oct. 13, 1934  5 Sheets-Sheet 5

INVENTOR
E.A.J. KOCH
BY
Sydney E. Page.
ATTORNEY

Patented May 11, 1937

2,079,808

UNITED STATES PATENT OFFICE 2,079,808

HEATING SYSTEM

Ernst August Julius Koch, London, England

Application October 13, 1934, Serial No. 748,271
In Great Britain October 19, 1933

18 Claims. (Cl. 237—8)

This invention relates to heating systems of the kind in which a liquid heat carrier, such as hot water, is circulated without loss of heat carrier in a closed circuit.

One object of the invention is to provide means for detecting leaks of heat carrier from such systems.

A further object of the invention is to provide safety devices which, on the occurrence of a leak, will isolate the generator from the system, reduce the supply of heat medium from the generator into the system, or reduce the fuel supply to the generator.

In these heating systems the volume of heat carrier normally varies at a rate dependent upon the rate of change of temperature within the system. Further, for a given system the normal rate of change in volume due to temperature variations can be calculated with a fair degree of accuracy.

Consequently if the volume in the system diminishes at an abnormal rate this can only be due to a leak of heat carrier from the system.

According to the present invention a method of controlling a closed heating system employing a circulating heating medium consists in measuring the rate of reduction in volume of heating medium in the system, comparing said rate of reduction of volume with a standard rate of reduction in volume and reducing the supply of heating medium from the generator to the system when the volume of heating medium diminishes at a rate greater than said standard rate of reduction.

According to a further feature of the invention a method of controlling a closed heating system employing a circulating heating medium consists in measuring the rate of increase in volume of heating medium in the system, comparing said rate of increase of volume with a standard rate of increase of volume and decreasing the fuel supply to the generator when the volume of heating medium increases at a rate greater than said standard rate of increase of volume.

The invention will now be described with reference to the accompanying drawings in which several arrangements according thereto are diagrammatically illustrated by way of example.

In the drawings

Fig. 1 shows a heating system of the kind to which the invention may be applied;

Figs. 2, 3, 4 and 5 show four different means for closing an isolating valve for the generator when the rate of reduction of volume of heating medium exceeds a predetermined value; Figures 2A and 2B show details of construction of the arrangements shown in Figures 2, 3, 4 and 5;

Fig. 6 shows the arrangement of Fig. 5 having incorporated therein means for compensating for the effect on the reduction in volume of changes in temperature in the generator;

Fig. 7 shows the arrangement of Fig. 5 having incorporated therein means for compensating for the effect on the reduction in volume of changes in the temperature in the generator and in the flow pipe of the system;

Figure 9:
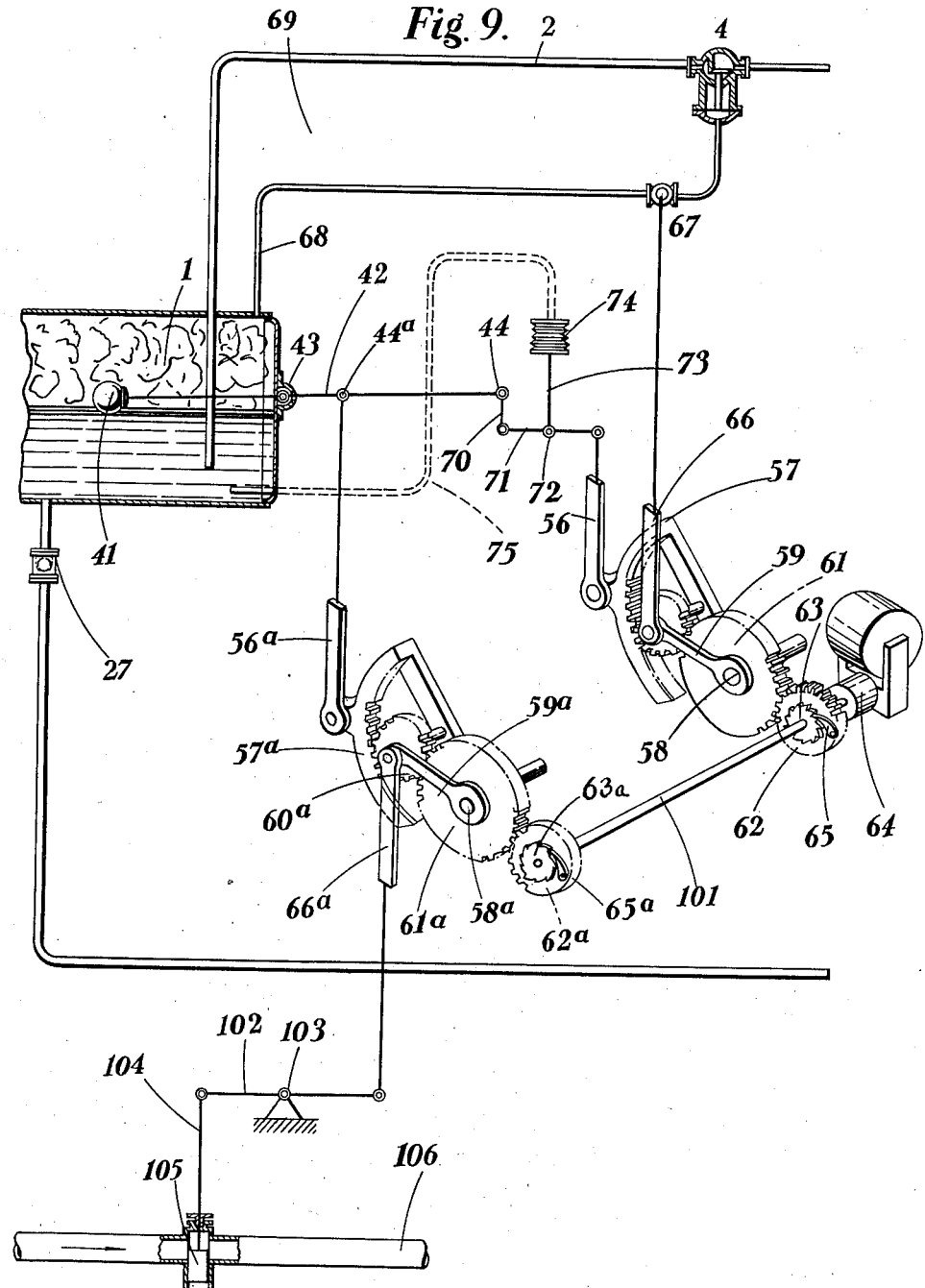

Fig. 8 shows an arrangement similar to that of Fig. 7 in which is also incorporated means for compensating for the effect on the reduction in volume of changes in the return pipe temperature as well as of changes in the generator flow pipe temperatures; and Fig. 9 shows an arrangement similar to that of Fig. 6 having also incorporated therein means for reducing the fuel supply to the generator when the increase in volume of heat carrier exceeds a predetermined value.

In the drawings like reference numerals designate the same or similar parts.

As shown in Fig. 1 the heating system comprises a generator 1 connected by a pipe 2 to a pump 3 which forces the hot water through a normally open isolating valve 4 into the flow pipe 5. Heat consumers 6, 6' are connected between the flow pipe 5 and a return pipe 7 through which the water returns to the generator 1.

In this system the water is heated to a temperature above that of its boiling point at atmospheric pressure and the formation of steam is prevented by maintaining the pressure above that at which steam would form at the temperature employed.

The generator 1 is not full and the space above the water is used as an expansion chamber to compensate for changes in volume of the water due to variations in temperature.

Fig. 2 shows in greater detail the heat generator 1 and the gear which operates isolating valve 4. A float 9 is fixed to a lever 10 secured to a spindle 10a mounted in a housing 11 attached to the end of the generator. The spindle 10a projects through the housing 11 and has attached to it outside the housing an arm 12.

The housing 11 is indicated diagrammatically in Fig. 2, and its construction is shown in sectional elevation in Fig. 2A and in sectional plan in Fig. 2B. This construction of housing however, is known, and forms no part of the present invention.

The outer end of arm 12 is pivoted at 12a to the rod 13 of a piston 14 operating in a cylinder 15. The lower and upper part of this cylinder are connected by a channel 16, the flow in which can be regulated by a valve 17. According to the flow of oil from the lower or upper part of this cylinder a different degree of damping action between piston and cylinder can be obtained. Below a certain speed the piston moves freely in the cylinder whilst at a higher speed the cylinder has to follow the piston.

By means of pivot 18 and lever 19 the movement of the cylinder is transferred to a piston valve 20. The cylinder 20a of valve 20 is connected by pipe 20b to atmosphere, by pipe 20c to the flow pipe 5 and by pipe 20d to the upper part of a cylinder 21 containing a piston 22 secured to the stem of the valve 4. At its upper end the valve 4 is loaded by spring 23 in order to close valve 4 whenever the pressure on both sides of the piston is equal.

When in its lower position the valve 20 connects the upper part of cylinder 21 to atmosphere, valve 4 therefore is opened against the pressure of the spring by the pressure from the pump 3. In the upper position the upper part of cylinder 21 is also connected to pump 3 and therefore the valve 4 is closed by spring 23.

Preferably means is provided for retaining the isolating valve in the closed position after it has been moved to that position by the mechanism according to the invention.

For example, a projection 4a on the valve stem (in Fig. 2) may co-operate with a latch 4b to lock the valve closed, and a manually operable lever 4c may be provided to release the valve when required.

According to a modification of the invention, means may be provided for operating the isolating valve when the volume of heat carrier in the generator diminishes to or below a predetermined value, irrespective of the speed of reduction of the volume. For example, as shown in Figure 2 the piston 14 may be provided with a boss 14a which engages the upper end of the cylinder 15 when the float falls to a predetermined level so that further downward movement of the float will cause the cylinder 15 to be directly carried upwards with the piston 14.

The valve 17 is set so that during falling movements of float 9 due to normal reduction in volume of the water, the leak through the channel 16 is sufficient to permit the piston 14 to move freely in the cylinder 15. If, however, a leak occurs in the system the rate of fall of the float will be great enough to move the piston 14 at a rate such that the cylinder 15 is moved therewith, thereby effecting closing of the isolating valve 4.

Figure 3:
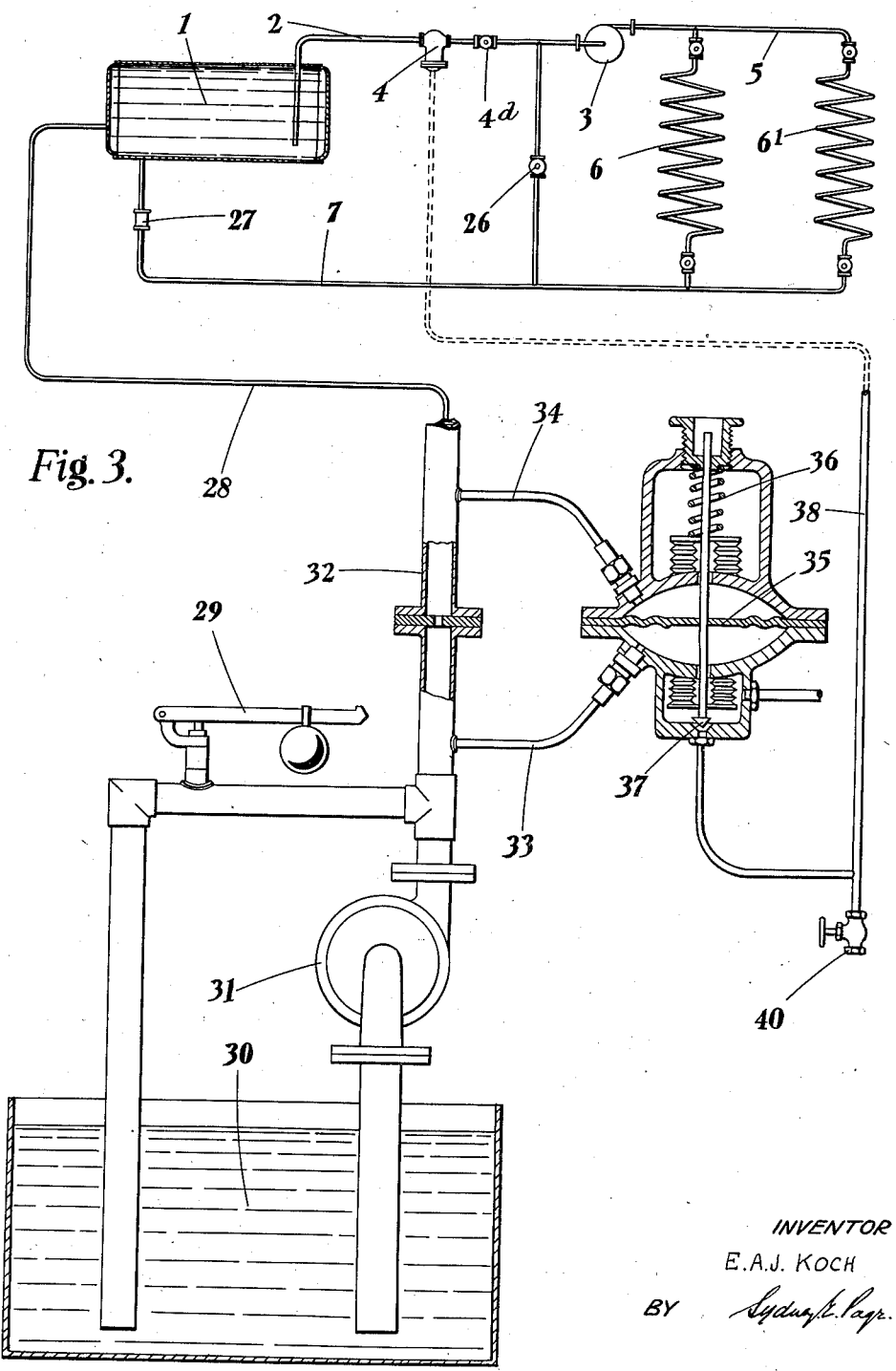

Figure 3 shows one embodiment of the invention in a heating circuit in which the equalization vessel is outside the heat generator.

1 is the heat generator from which the heating medium passes through pipe 2 through an isolating valve 4 and regulating valve 4d to a pump 3 which is also connected by means of a valve 26 to the return pipe 7 from the heating circuit. From pump 3 the heating medium is sent through the flow pipe 5 to the heat appliances 6, 6' and returns through the return pipe 7 through the non-return valve 27 into the heat generator.

Variations in volume in the system are equalized through pipe line 28 which is connected to a safety valve 29 which opens whenever an increase of volume occurs and causes a pressure over working pressure and returns the excess liquid to the equalization tank 30. If the liquid in the heat circuit contracts and the pressure consequently falls, then the system is replenished by means of a pump 31 which delivers water into the heat generator 1.

Fitted into the pipe line 28 is a Venturi tube 32 with two connections 33 and 34 to a diaphragm 35. This diaphragm is loaded by a spring 36 and keeps a valve 37 shut. If liquid flows from the equalization tank 30 to the heat generator 1 then due to the flow through the Venturi tube 32 the pressure in pipe 33 will be larger than in tube 34 and if this difference in pressure exceeds the pressure of spring 36 then valve 37 will open and pressure liquid get through line 38 on to a diaphragm connected to valve 4 and close this valve to interrupt the connection of the heat generator with the system through the flow pipe. Due to the presence of the return valve 27 the generator 1 is then isolated from the system. Valve 4 is opened by releasing the pressure on diaphragm 39 by opening a valve 40 which is connected to the line 38.

The pressure of spring 36 can be adjusted so as to cause valve 37 to be opened when the speed in Venturi tube 32 reaches a predetermined value.

Figure 4:
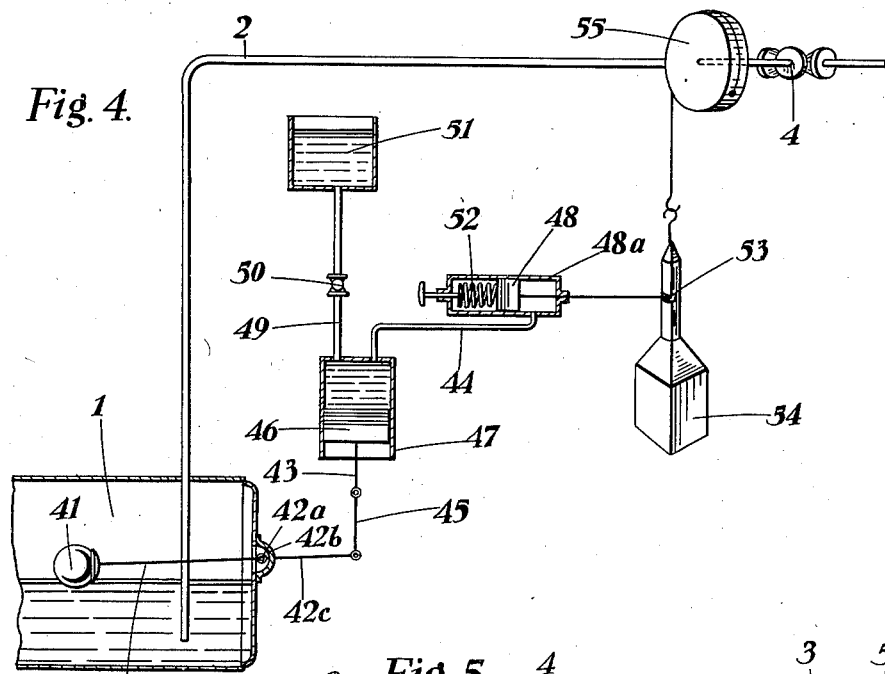

In Figure 4 another embodiment of this invention is shown but in connection with a system in which the equalization space is provided for in the heat generator.

1 is the heat generator from which the outflow 2 leads through an isolating valve 4 to the system. This is not shown in this figure as its arrangement is the same as in Figure 3. A float 41 is carried on a lever 42 secured to a spindle 42a mounted in a housing 42b and carrying outside the housing an arm 42c. This arrangement is the same as that shown in Figs. 2A and 2B. The arm 42c is connected to rod 45 of a piston 46 sliding in a cylinder 47 which is connected by pipe 44 to a cylinder 48a containing a second but smaller piston 48 and by means of a pipe 49 and a regulating valve 50 to an expansion tank 51. By suitably adjusting valve 50 it is possible to move piston 46 upwards and downwards at a predetermined speed without causing a pressure on piston 48 which exceeds the force of the spring 52 against which this piston works. If the speed with which this piston 46 is moved upwards exceeds a predetermined value, then piston 48 is moved and releases catch 53 and weight 54 will fall and close by means of wheel 55 isolating valve 4.

In those cases where the heat generator is full and the equalization vessel is outside in the form of an open tank the float might equally well be fitted to this vessel.

Figure 5:
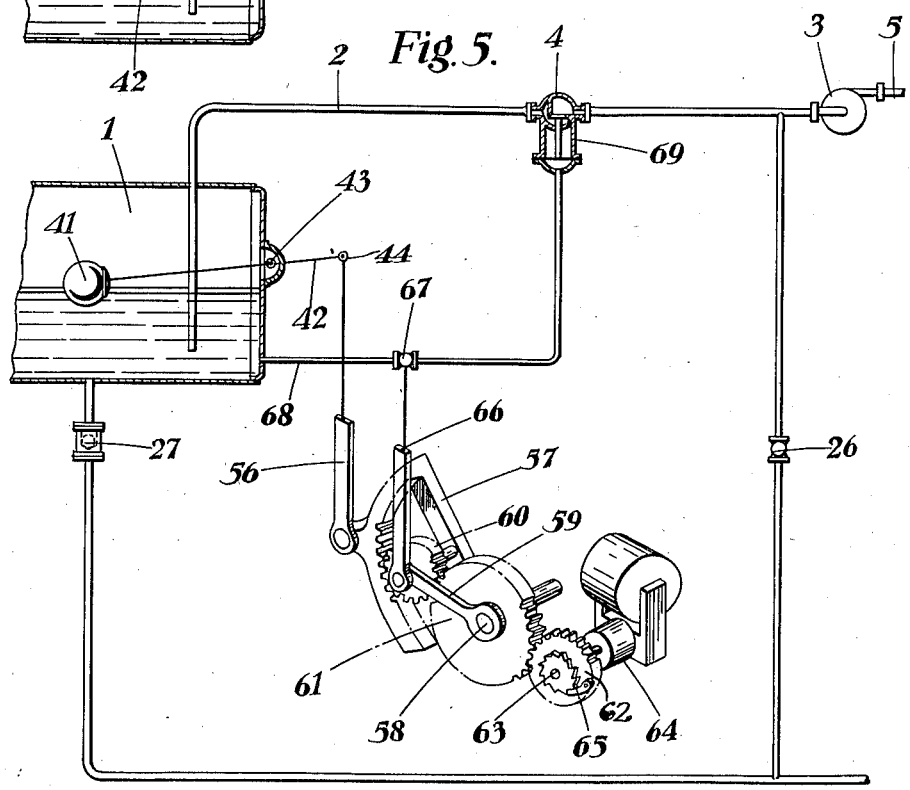

Another embodiment of the invention is shown in Figure 5.

Here a float 41 in heat generator 1 is carried on a lever 42 pivoted at 43. On its extremity 44 is pivoted rod 56 which is connected to a toothed sector 57 moving round an axle 58. Round the same axle swings an arm 59 which on its other end carries a pinion 60. This pinion is in mesh with the teeth of the sector 57, and with a wheel 61 free on shaft 58.

In mesh with the wheel 61 is a pinion 62 freely mounted on the shaft of a ratchet wheel 63 which is driven at a constant speed by a motor 64, preferably through a non-reversible drive.

The motor 64 drives the ratchet 63 in the same direction as that in which the pinion 62 turns when the float 41 sinks.

Pivoted on the side of pinion 62 is a pawl 65 engaging with ratchet 63.

As long as the float 41 sinks at a rate due to normal reduction in volume of the water in the system the pinion 62 is driven at a speed less than that of the ratchet 63 and consequently the pawl 65 merely slides over the teeth of the ratchet.

If, however, the volume of water diminishes at an abnormally rapid rate the float 41 in falling will tend to drive the pinion 62 faster than the ratchet 63. This, however, is prevented by engagement of the pawl 65 with the teeth of the ratchet 63. Consequently further downward movement of float 41 causes pinion 60 to run round the periphery of wheel 59 in a clockwise direction in Fig. 5 with the result that link 66 is pulled upward and opens a valve 67 which admits water under pressure from the generator 1 through a pipe 68 to a control device 69 for the isolating valve 4, whereby valve 4 is closed.

If desired, means may be provided for compensating for the effect on the float 41 of changes in volume due to the variations in the temperature of the water in the generator 1, such means is illustrated in Fig. 6 as applied to the control mechanism shown in Fig. 5.

In this construction the float 41 is carried on the arm 42 pivoted at 43, but the extremity 44 of this arm is not directly connected to the link 56. Instead of employing a direct connection the end 44 is connected through a link 70 to one end of a lever 71 pivoted at a point 72 between its ends to a rod 73 connected to a thermostat indicated diagrammatically at 74. The thermostat is connected to the generator 1 through a pipe 75. The other end of the lever 71 is pivoted to the link 56.

If the temperature in the generator 1 increases, then the thermostat 74 expands and lowers the pivot point 72. On the other hand, if the temperature in the generator 1 falls, the pivot point 72 will be raised. Owing to the reversal of motion of the link 56 which results from the insertion of lever 71, the motor 64 rotates anticlockwise as seen in Figs. 6 to 9, instead of clockwise as seen in Fig. 5. Downward motion of link 56, instead of upward motion as in Fig. 5, is effective to open valve 67 in the arrangements of Figs. 6 to 9.

The function of the gear train, ratchet and constant speed motor is to detect excess over a predetermined limit in rate of movement of link 56. In the embodiment shown in Fig. 5, the movements of the float 41 due to change of temperature of the water are fully transmitted to link 56, so that the ratchet apparatus must be so adjusted as to be insensitive to the maximum rate of decrease of volume which can result from temperature fall. In the embodiment shown in Fig. 6, the movements of the float due to change of temperature of the water are largely compensated, and the ratchet apparatus may therefore be adjusted for a far greater sensitivity, the limit being determined by the inaccuracy of the temperature compensation.

A greater sensitivity still is possible if the temperature compensation is governed by the temperature of the water not only in the expansion vessel 1, but also at other points in the system.

Fig. 7 shows a further embodiment wherein means are provided for compensating for the effect on the float of changes in volume due to changes in temperature, both in the generator 1 and in the flow pipe 2. With this arrangement the float 41 is, as in Fig. 6, carried on an arm 42 of which the extremity 44 is connected by link 70 to a lever 71 pivoted at 72 of which the other end is pivoted to link 56.

The pivot 72 is carried on the end of a rod 73 which is suspended from a lever 76 pivoted at its ends to rods 77 and 78 respectively, connected to thermostats 79 and 80. The thermostat 79 is connected to the generator 1 by a pipe 81, while the thermostat 80 is connected to the flow pipe by pipe 82.

Fig. 8 shows a further embodiment in which the pivot point 72 of lever 71 is carried at the end of a rod 73 suspended from lever 76. This lever 76 is, in this case, acted upon by three thermostats 83, 84 and 85. Thermostat 83 is connected to lever 76 through rod 86, whilst thermostats 84 and 85 are connected by rods 87 and 88 to a lever 89 and thence through rod 90 to lever 76. Thermostat 83 is connected through pipe 91 to the generator. Thermostat 84 is connected through pipe 92 to the return pipe 7 of the system, and thermostat 85 is connected through pipe 93 to the flow pipe 2.

By this means the position of the pivot point 72 is influenced by the temperatures in the generator, the flow pipe and the return pipe.

If desired, instead of closing the isolating valve 4, the control mechanism, according to the invention, may open a valve supplying fresh heating medium to the generator.

Instead of or in addition to effecting operation of the isolating valve 4 the mechanism, according to the invention, may act to cut off the supply of power to the pump 3 which circulates the heat carrier in the system, for example, by opening an electric switch controlling the supply of current to a motor driving said pump.

The foregoing has described control means for the system operated when the rate of reduction in volume of heat carrier exceeds a predetermined value, whereby damage to the system owing to loss of heat carried due to leaks may be avoided.

If all or some of the heat consumers are shut down, the demand for heat is reduced and consequently the temperature in the generator and in the flow pipe will rise and the volume increase. If this rise is sudden, it is desirable to reduce the heat supply to the generator as soon as possible.

According to a further feature of the invention the rate of increase in volume of heat carrier in the system which occurs when the consumers are shut off may be measured and compared with a standard rate of increase, and means may be provided to reduce the heat supply to the generator when the rate of increase in volume exceeds the standard rate of increase.

If desired, the control mechanism may act to shut off or reduce the fuel supply to the generator. One means for carrying this form of the invention into effect is shown in Fig. 9 in which in addition to the mechanism shown in Fig. 6 for controlling the isolating valve 4, there is provided a similar mechanism for reducing the supply of fuel to the generator when the rate of increase in volume in the system exceeds a predetermined value.

The additional mechanism for this purpose comprises a toothed sector 57a connected by a link 56a to the float arm 42 at 44a.

Carried on an arm 59a pivoting about a shaft 58a is a planet wheel or pinion 60a engaging with the teeth on the sector 57a and also with a gear wheel 61a rotatable about the shaft 58a. The gear wheel 61a engages with a pinion 62a freely mounted on the shaft 101 to which is secured the ratchet 63 of the mechanism 56—65 of Fig. 6. Secured to this pinion 62a is a pawl 65a co-operating with ratchet 63a.

Ratchets 63 and 63a are driven at constant speed by the motor 64 and the operation of the mechanism associated with ratchet 63 has already been explained with reference to Fig. 6.

The operation of the mechanism associated with the ratchet 63a will now be described.

If the temperature in the system rises at an abnormally rapid rate the volume of heat carrier will increase and therefore the level in the generator will rise and lift the float 41, whereby sector 57a will be lowered and the planet wheel 60a will be turned in a counter-clockwise direction, thereby rotating the pinion 62a in a counter-clockwise direction i. e. the same direction as that in which ratchet 63a is rotating.

If the level in the generator rises abnormally rapidly the pinion 62a will attempt to turn faster than the ratchet 63a but will be prevented from doing so by pawl 65a. Consequently the planet wheel 60a will be moved bodily downwards thereby pulling down link 66a.

This link 66a is connected to a lever 102 pivoted at 103 and connected by a link 104 to a valve 105 controlling the flow of liquid fuel to the generator through pipe 106.

When link 66a is pulled down the valve 105 is moved towards the closed position.

It is pointed out that although means for compensating for temperature variations may, as described above, be employed with the systems shown, for example, in Figs. 6 to 8, such compensating means are not used with the mechanism 56a to 65a shown in Fig. 9 since this mechanism is controlled in accordance with temperature changes.

Thus in Fig. 9 a thermostat 74 is provided to compensate for the effect on the mechanism 56—65 of temperature changes, whereas no such compensating mechanism is provided for the mechanism 56a to 65a.

What I claim is:—

1. In a closed heating system of the type set forth the combination of a normally open isolating valve for the whole or part of the system, a control device for said valve, said control device being influenced in a direction to close the valve by increases in the rate of reduction of volume of heat carrier in the system, and means acting on said control device to maintain the valve open when the rate of reduction in volume is less than a predetermined value.

2. In a closed heating system of the type set forth the combination of a normally open isolating valve for the whole or part of the system, means adapted to close the valve when the rate of reduction in volume of heat carrier in the system exceeds a predetermined value and compensating means acting to modify the operations of said closing means in accordance with variations in the temperature of the heat carrier whereby the effect of change in volume due to temperature variations is counteracted.

3. In a closed heating system of the type set forth the combination of a displaceable member, means for moving said displaceable member at a speed proportional to the rate of reduction of volume of heat carrier, a normally open isolating valve for the whole or part of the system, mechanism for transmitting the movement of said displaceable member to the isolating valve to close said valve, and a pressure leak device disposed in said transmission mechanism, said leak device being so set that as long as the speed of the displaceable member is below a predetermined value the leak is sufficient to prevent transmission of movement to the isolating valve, whereas when the speed of the displaceable member is greater than the predetermined value, the loss of pressure due to the leak is insufficient to prevent transmission and the isolating valve is closed.

4. In a closed heating system of the type set forth having an equalization vessel outside the system from which heat carrier is automatically fed into the system on a reduction in volume of the heat carrier therein, the combination of means for measuring the rate of flow of heat carrier from the equalization vessel to the system in terms of a pressure difference, a normally open isolating valve for the whole or part of the system, and a control device for said valve acted upon by a spring in a direction to maintain the valve open and in the opposite direction by the pressure difference whereby, when the pressure difference exceeds the spring pressure the valve is closed.

5. In a closed heating system of the type set forth the combination of an expansion vessel, a float disposed in said vessel, a normally open isolating valve for the whole or part of the system, a connection between said float and said valve, said connection being inoperative when the float falls at speeds below a predetermined value, and means rendering said connection operative to close the valve when the speed of fall of the float exceeds this predetermined value.

6. In a closed heating system of the type set forth the combination of an expansion vessel, a float disposed in said vessel, a rotatable member, means for driving said rotatable member at a constant speed, a second rotatable member, an isolating valve for the whole or part of the system, an operating member for said valve, a pinion carried on said operating member, a motion transmission train including said pinion and connected at one end to the float and at the other end to the second rotatable member so as to rotate said member in the same direction as the first rotatable member when the float falls, and means preventing the second rotatable member from rotating faster than the first rotatable member, whereby when the float falls faster than a predetermined speed the pinion is moved bodily to an extent dependent on the difference between the actual speed of the rotatable members and the speed at which the second rotatable member would be driven by the float if said member were free, said movement of the pinion serving to close the isolating valve.

7. In a closed heating system of the type set forth the combination of an expansion vessel, a float disposed in said vessel, normally operative means for supplying heat to the generator, a connection between said float and said heat supplying means, said connection being inoperative when the float rises at speeds below a predetermined value, and means rendering said connection operative to reduce the heat supply to the generator when the speed of rise of the float exceeds a predetermined value.

8. In a closed heating system of the type set forth the combination of an expansion vessel, a float disposed in said vessel, a rotatable member, means for driving said rotatable member at a constant speed, a second rotatable member, combustion control means for the generator, an operating member for said control means, a pinion carried on said operating member, a motion transmission train including said pinion and connected at one end to the second rotatable member so as to rotate said member in the same direction as the first rotatable member when the float rises, and means preventing the second rotatable member from rotating faster than the first rotatable member whereby when the float rises faster than a predetermined speed the pinion is moved bodily to an extent dependent on the difference between the actual speed of the rotatable members and the speed at which the second rotatable member would be driven by the float if said member were free, said movement of the pinion serving to operate the combustion control means to reduce the heat supply to the generator.

9. In a closed heating system of the type set forth the combination of a normally open isolating valve for the whole or part of the system, and a single means adapted to close said valve both when the rate of reduction in volume of heat carrier in the system exceeds a predetermined value and also when the volume diminishes to a predetermined value irrespective of the rate of diminution.

10. In a closed heating system of the type set forth the combination of an expansion vessel, a float disposed in said vessel, a normally open isolating valve for the whole or part of the system, a connection between said float and said valve, said connection being inoperative when the volume is greater than a predetermined value and the float is falling at speeds below a predetermined speed, and means rendering said connection operative to close the valve both when the speed of fall of the float exceeds the predetermined speed and also when the volume diminishes to or below the predetermined value irrespective of the rate of diminution.

11. In a closed heating system of the type set forth, the combination of an expansion vessel, measuring means to measure the volume of heat carrier in said vessel, a control member responsive to an excess over a predetermined rate of decrease of the said volume of heat carrier, and means controlled by said control member to reduce the feed of heat carrier from the generator.

12. In a closed heating system of the type set forth, the combination of an isolating valve for the whole or part of the system, a control member responsive to an excess over a predetermined limit of the rate of decrease of volume of heat carrier in the system, and means controlled by said control member to close said valve.

13. In a closed heating system of the type set forth, the combination of a control member responsive to an excess over a predetermined limit of the rate of decrease of volume of heat carrier in the system, and means controlled by said control member to reduce the feed of heat carrier from the generator.

14. In a closed heating system of the type set forth, the combination of a control member responsive to an excess over a predetermined limit of the rate of increase of volume of heat carrier in the system and means controlled by said control member to reduce the heat supply to the generator.

15. A method of controlling a closed heating system employing a circulating heat carrier which consists in obtaining an indication of excess over a predetermined limit of the rate of decrease in volume of heat carrier in said system and in reducing the feed of heat carrier from the generator in response to said indication.

16. A method of controlling a closed heating system employing a circulating heat carrier which consists in obtaining an indication of excess over a predetermined limit of the rate of increase in volume of heat carrier in said system and in reducing the heat supply to the generator in response to said indication.

17. In a closed heating system of the type set forth, the combination of a control member responsive to excess over a predetermined limit of the difference between the actual rate of decrease of volume of heat carrier in the system and the rate of decrease of said volume due to temperature change, and means controlled by said control member to reduce the feed of heat carrier from the generator.

18. In a closed heating system of the type set forth, the combination of measuring means responsive to decrease in the volume of heat carrier in the system, compensating means responsive to the temperature decrease of at least one point in the system, a control member responsive to said measuring means and oppositely responsive to said compensating means, and means responsive to excess over a predetermined limit in the rate of response of said control member to reduce the feed of heat carrier from the generator.

ERNST AUGUST JULIUS KOCH.